Nov. 11, 1930.  J. R. NEILSON  1,781,188
TREATING MATERIAL DISPERSION
Filed Aug. 1, 1929
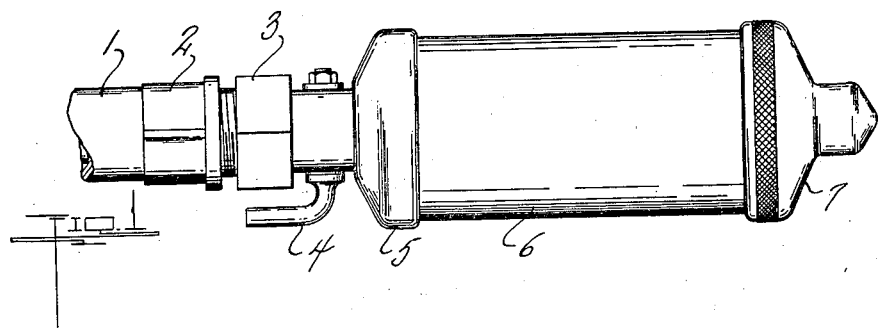
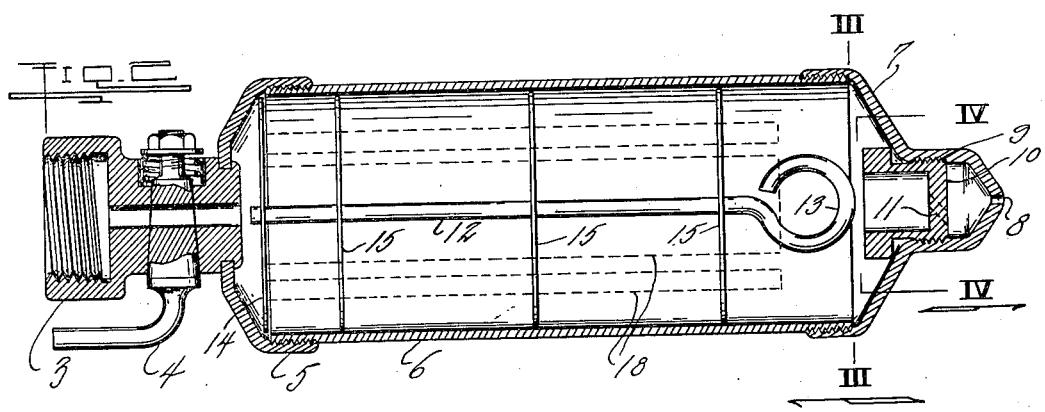
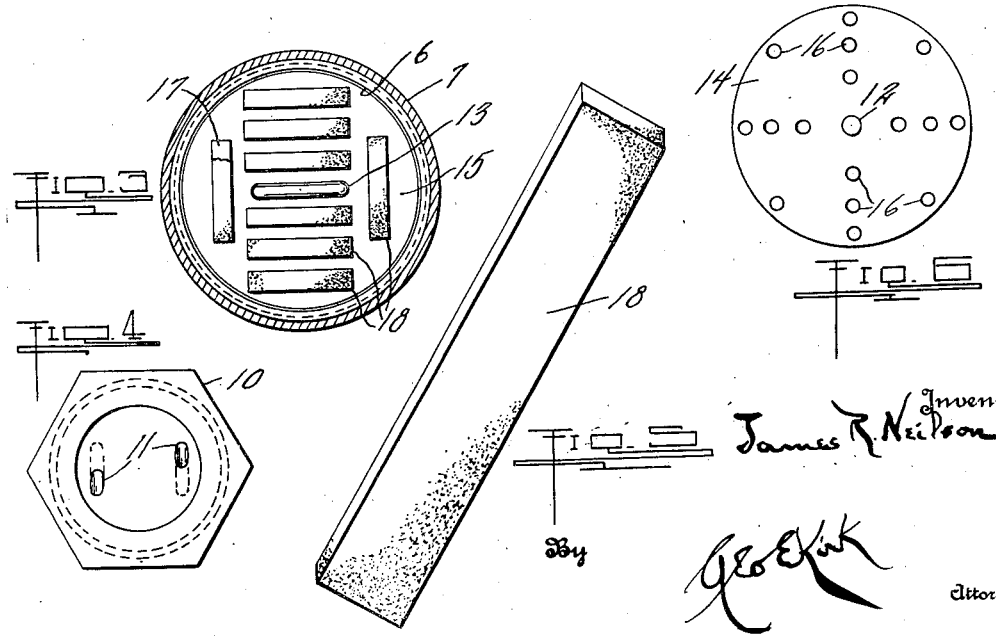

Patented Nov. 11, 1930

1,781,188

UNITED STATES PATENT OFFICE

JAMES R. NEILSON, OF TOLEDO, OHIO, ASSIGNOR OF ONE-HALF TO EARL M. MORLEY, OF DELTA, OHIO

TREATING MATERIAL DISPERSION

Application filed August 1, 1929. Serial No. 382,766.

This invention relates to directed dispersion of emulsions, solvents or suspensions.

This invention has utility when incorporated in insecticide guns, say as poisons for direct pressure connection in dissolving for maintaining strength of delivered spray.

Fig. 1 is a side elevation of a tool adaptable in carrying out the invention herein, showing a nozzle for the spray of an insecticide spray gun;

Fig. 2 is a longitudinal section of the gun of Fig. 1;

Fig. 3 is a section on the line III—III, Fig. 2;

Fig. 4 is a section on the line IV—IV, Fig. 2;

Fig. 5 is a detail view in perspective of an insecticide element of the cartridge for the gun; and Fig. 6 is an end elevation of the terminal baffle remote from the delivery end of the gun.

Pressure water line 1 is shown as terminating in fitting 2 to which is connected fitting 3 having therein cut-off cock 4. This cock 4 is shown as assembled with head 5 mounting cylinder 6 terminating in detachable head 7 at discharge opening 8 of the nozzle. Within this discharge or delivery head 7 there is threaded portion 9 in which is mounted supplemental swirl effecting fitting 10 having ports 11 therein. With this fitting 10 in the gun, the delivery port 8 may effect a spraying swirl for shorter range of operation, while removal of this fitting 10 allows a more extended jetting of the spray.

Within the cylinder 6 upon rod 12 having handle loop 13 may be mounted disks 14, 15 providing baffles. The disk 14 is shown as having openings 16 therethrough. The disks 15 are provided with openings 17 therethrough providing seats for blocks or bodies 18, thus assembled through these disks 15 in providing with the disks 15 a series of baffles in the chamber of the cylinder 6.

The body 18, in the operation of this device for insecticide purposes, may be the carrier for the active agent. In practice, say if contact poison is to be used, an insecticide as nicotine, and body or filler material therefor, may be combined in producing the block hereunder, say on a basis of:

½ oz. nicotine oil, ¾ oz. brown sugar, ¾ oz. acacia, and ¼ oz. water.

This serves as a binder and body disseminating the active agent nicotine throughout the mass. This may be worked up into a loaf or body and sliced to provide the blocks 18 of such dimension as to be assembled through seats 17 in the several disks 15 and rest upon the disk 14. As so grouped or inserted in the cylinder 6 and the cap or head 7 replaced, turning on the valve 4 allows the water to be sub-divided in passing through the openings 16 as well as around the periphery of the disk 14, thence between the series of partitions formed by the disks 15 as having clearance relatively to the cylinder 6. In this progress past the series of baffles, the water acts as a dissolving agent and is thus effective as a carrier for the active agent in its dispersion from the spray nozzle.

A feature of material utility hereunder is that the strength of the solution may approximate an average throughout the entire period of washing away of the several bodies 18, which of course may be for a full or less than a full charge in the several seats 17. This approximately uniform strength for the spray is attained hereunder due to the configuration of the block as to its surface area, approximating a constant during the life of the block. The lateral areas of the block greatly predominate and the broad sides have a predominance over the narrow sides. According, the dissolving region for the broad sides maintained during the life of the spray exposes practically the constant area for dissolving action of the water as passing through this multiple baffle chamber of the spray gun.

By the use of this acacia or gum arabic, there is given adherent action for the body in the small quantity of water adopted, while the sugar is also a factor in assembly, sealing or uniting the active agent in the body. The difficulty or not readily soluble acacia, in the presence of the excess of water is soluble and accordingly is gradually carried out the nozzle with the sugar and the nicotine, with no objectionable residue.

In the case of other active agents as stomach poison, for instance arsenate of lead as an insecticide, the ratio in building up the blocks may be:

¾ oz. arsenate of lead, ¾ oz. brown sugar, ¼ oz. of acacia, and ½ oz. water.

These are typical mixtures for active agents effective in carrying out the invention hereunder. This oblong thin type of filler-carrying soluble block for the active agent has a surface area factor as to the minimum surface area for an equal solid, preferably as herein disclosed, in excess of three times the normal. The body provides adhesive holding action for the active agent on depositing on plants, etc.

What is claimed and it is desired to secure by United States Letters Patent is:

1. The method of dispersing sub-divided treating coating material comprising disseminating the material in a body of a surface area remaining approximately constant while dissolving away, and subjecting such area to pressure dispersing solvent attack throughout its area.

2. The method of dispersing sub-divided treating coating material comprising disseminating the material in a substantially water soluble body of a surface area remaining approximately constant while dissolving away, and subjecting such area to pressure dispersing water attack throughout its area.

3. The method of dispersing sub-divided treating insecticide material comprising disseminating the material in an adhesive-gum definite-form body of a surface area remaining approximately constant while dissolving away, and subjecting such area to pressure multiple baffle dispersing water attack throughout its area.

4. The method of dispersing sub-divided coating material comprising disseminating an active agent in an adhesive gum difficultly soluble in water, molding said gum and agent into a definite form body of a surface area remaining approximately constant while dissolving away, and subjecting such area to pressure multiple baffle dispersing water attack throughout its area.

5. The method of dispersing sub-divided coating material comprising disseminating active agent in an adhesive gum difficultly soluble in water, introducing an entraining adhesive therewith, molding said gum, agent and entraining adhesive into a definite form body of a surface area remaining approximately constant while dissolving away, and subjecting such area to pressure multiple baffle dispersing water attack throughout its area.

6. The method of dispersing sub-divided coating material comprising disseminating an active agent in acacia and brown sugar, molding said agent, acacia and brown sugar as a plastic mass by the addition of water to provide a definite form body of a surface area remaining approximately constant while dissolving away, and subjecting such area to pressure multiple baffle dispersing water attack throughout its area.

7. The method of dispersing sub-divided treating insecticide material comprising disseminating the material in a body of the surface area remaining approximately constant while dissolving away, locating said body in a chamber, exposing the body to pressure liquid attack in the chamber, and dispersing such pressure liquid by baffles in the chamber about the material as partitions in the chamber, said pressure liquid having solvent action throughout the area of the material.

In witness whereof I affix my signature.

JAMES R. NEILSON.